United States Patent [19]
Beretta

[11] Patent Number: 5,900,932
[45] Date of Patent: May 4, 1999

[54] TRISTIMULUS TEMPLATE-TYPE COLORIMETER

[75] Inventor: Giordano Bruno Beretta, Palo Alto, Calif.

[73] Assignee: Canon Information Systems, Inc., Irvine, Calif., CA

[21] Appl. No.: 08/887,423

[22] Filed: Jul. 2, 1997

Related U.S. Application Data

[63] Continuation of application No. 08/511,627, Aug. 7, 1995, abandoned, which is a continuation of application No. 08/085,180, Jul. 2, 1993, abandoned.

[51] Int. Cl.$^6$ ................. G01J 3/18; G01J 3/50
[52] U.S. Cl. ................. 356/328; 356/405; 250/226
[58] Field of Search ................. 356/328, 334, 356/405, 406; 250/226

[56] References Cited

U.S. PATENT DOCUMENTS

| | | |
|---|---|---|
| 3,490,849 | 1/1970 | Hambleton . |
| 3,929,398 | 12/1975 | Bates . |
| 4,082,415 | 4/1978 | Brooks et al. . |
| 4,247,202 | 1/1981 | Failes ................. 356/405 X |
| 4,402,611 | 9/1983 | Yuasa . |
| 4,425,501 | 1/1984 | Stauffer ................. 250/216 |
| 4,681,444 | 7/1987 | Ferber et al. ................. 356/318 |
| 4,692,883 | 9/1987 | Welson et al. ................. 364/571 |
| 4,744,657 | 5/1988 | Aralis et al. ................. 356/319 |
| 4,764,670 | 8/1988 | Pace et al. ................. 250/226 |
| 4,773,761 | 9/1988 | Sugiyama et al. ................. 356/405 |
| 4,876,166 | 10/1989 | Wake et al. ................. 430/7 |
| 4,895,445 | 1/1990 | Granger ................. 356/328 |

(List continued on next page.)

FOREIGN PATENT DOCUMENTS 63-255629  10/1988  Japan ................. 356/406

OTHER PUBLICATIONS

D.L. Spooner, "A Low–Cost Spectrocolorimeter", a description of his presentation at the Apr., 1993 ISCC Color Science Conference, Jul./Aug., 1993.

D.L. Spooner, "A Low–Cost Spectrocolorimeter Sensor", Dupont Printing & Publishing, Apr., 1993.

W.J. Gambogi, et al., "Diffractive Printing Methods Using Volume Holograms", preprint—IS&T/SPIE International Conference on Electronic Imaging, San Jose.

J.P. Ritzel, et al., "Silicon Photodiodes Matched to the CIE Photometric Curve Using Color Filter Glass", Optics & Photonics News, Apr. 1993, pp. 16–19.

G. Wyszecki, et al., "Color Science: Concepts and Methods, Quantitative Data and Formulae 2nd Edition", John Wiley & Sons 1982, pp. 243–248.

(List continued on next page.)

*Primary Examiner*—Vincent P. McGraw
*Attorney, Agent, or Firm*—Fitzpatrick, Cella, Harper & Scinto

[57] ABSTRACT

A template-type calorimeter comprising a light-transparent substrate having a diffraction grating on a surface thereof, the diffraction grating being operative to diffract light incident thereon from a spaced-apart aperture into its constituent spectral components. A template is provided on a surface of the substrate and arranged to receive the diffracted spectral components. The template has formed thereon at least three spatial filters, each for selectively transmitting diffracted spectral components in accordance with respective ones of the desired color-matching functions such as the CIE $\bar{x}(\lambda)$, $\bar{y}(\lambda)$, $\bar{z}(\lambda)$ or $\bar{r}(\lambda)$, $\bar{g}(\lambda)$, $\bar{b}(\lambda)$ color-matching functions. The diffraction grating and the template may be mounted on opposite sides of the substrate, or they may be mounted in a laterally spaced-apart relationship on the same side of the substrate, in which case the opposite side of the substrate is coated with a reflective material. Detectors are arranged adjacent and behind each spatial filter to detect the spectral components transmitted by the respective filters, and the entire assembly is mounted in a light-tight housing which houses the aperture and the assembly in the desired spaced-apart relationship.

53 Claims, 5 Drawing Sheets

U.S. PATENT DOCUMENTS

| | | |
|---|---|---|
| 4,979,803 | 12/1990 | McGuckin et al. . |
| 5,020,910 | 6/1991 | Dunn et al. .............................. 356/328 |
| 5,037,201 | 8/1991 | Smith, III et al. ...................... 356/326 |
| 5,050,990 | 9/1991 | Smith, III et al. ................... 356/405 X |
| 5,050,992 | 9/1991 | Drummond et al. ................... 356/328 |
| 5,053,299 | 10/1991 | Hanrahan et al. .......................... 430/7 |
| 5,083,252 | 1/1992 | McGuire ................................ 362/393 |
| 5,137,364 | 8/1992 | McGarthy .............................. 356/402 |
| 5,153,670 | 10/1992 | Jannson et al. ......................... 356/301 |
| 5,159,404 | 10/1992 | Bittner ................................... 356/328 |
| 5,162,927 | 11/1992 | Moss et al. ................................. 359/3 |
| 5,223,703 | 6/1993 | Setani .................................. 250/208.1 |
| 5,241,374 | 8/1993 | Yang et al. .............................. 358/29 |

OTHER PUBLICATIONS

Translation of Japanese Patent 63–255,629 To Yokota, Oct. 1988.

Edmund Scientific 1992 Annual Reference Catalog, Diffraction Brating, p. 50.

Butera "Color Identifying Coordinate Area Probe", IBM Tech. Disc. Bulletin, vol. 12, No. 11, Apr. 1970, p. 1828.

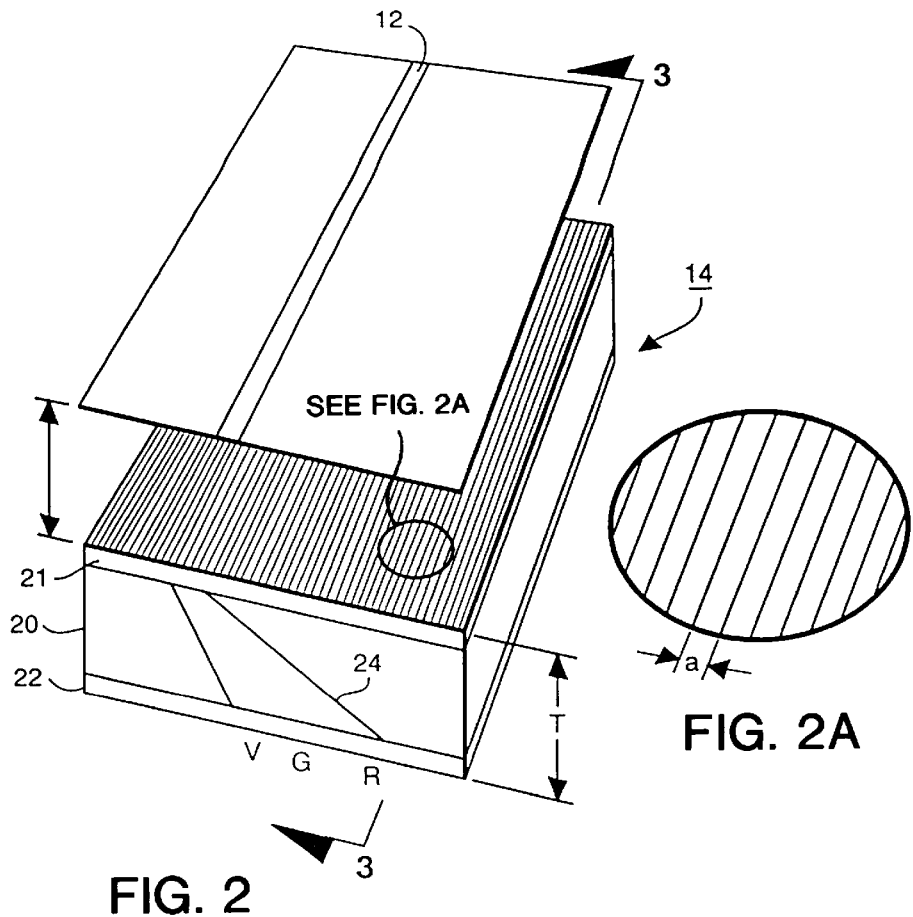
FIG. 2
FIG. 2A
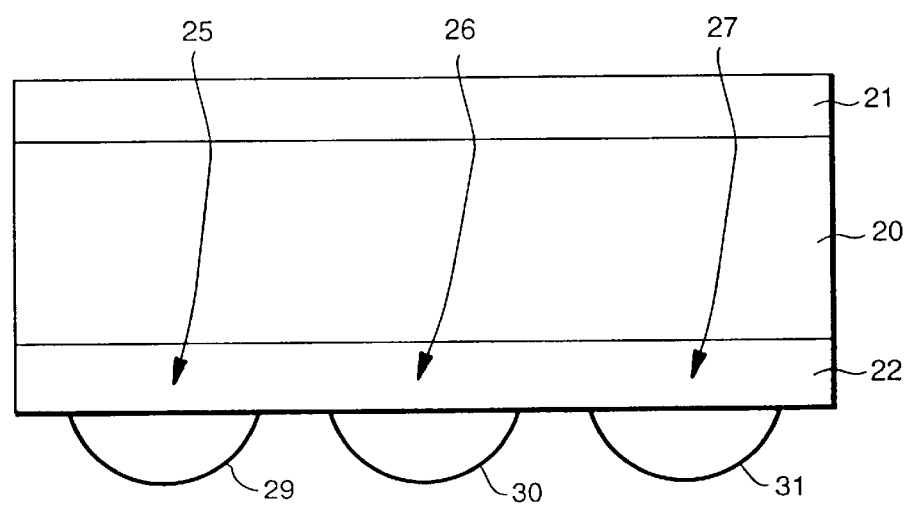
FIG. 3

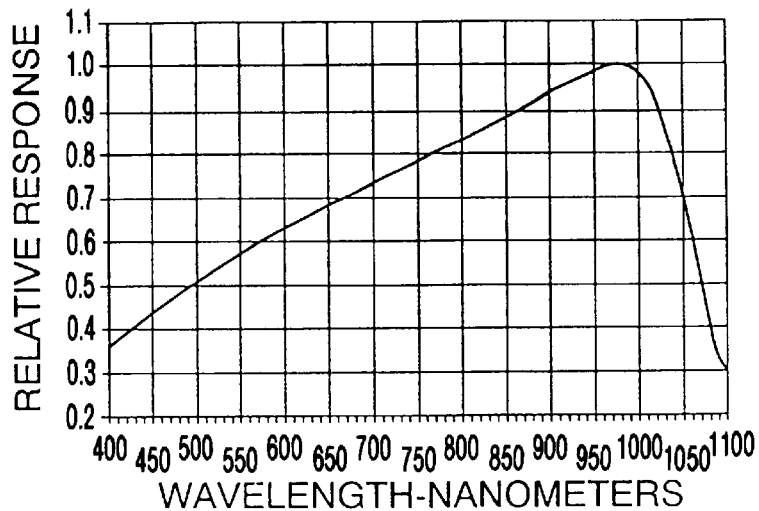
FIG. 6
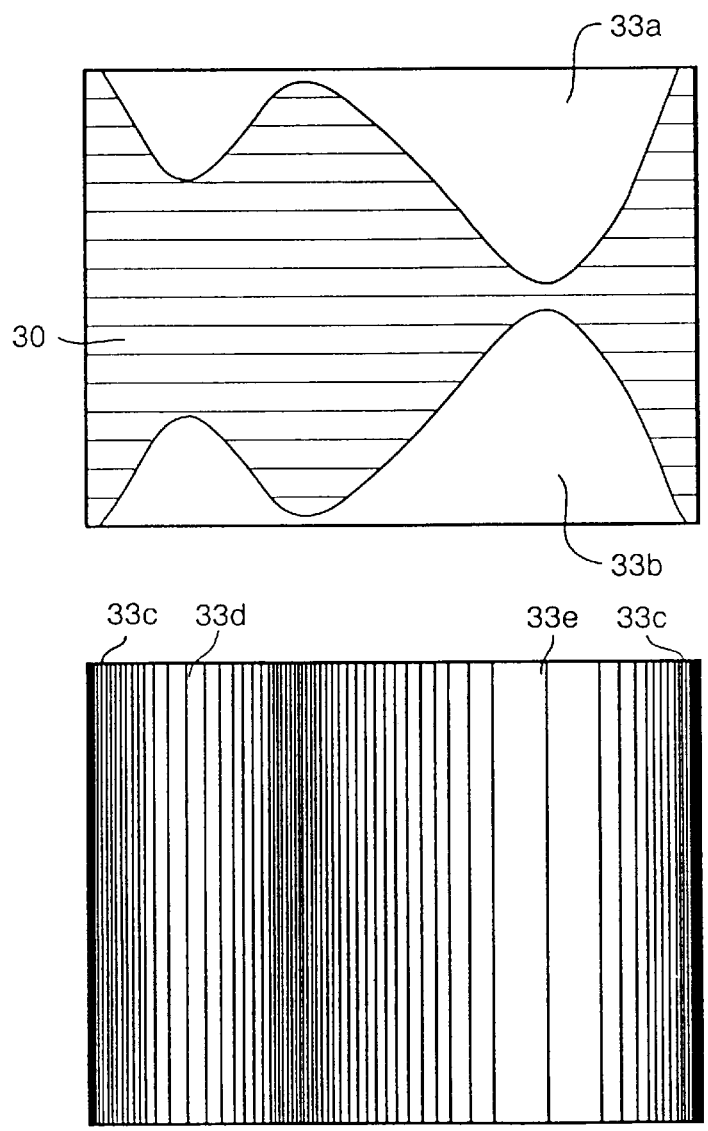
FIG. 7
FIG. 8

TRISTIMULUS TEMPLATE-TYPE COLORIMETER

This application is a continuation, of application Ser. No. 08/511,627 filed Aug. 7, 1995, now abandoned, which was a continuation of application Ser. No. 08/085,180 filed Jul. 2, 1993, now abandoned.

BACKGROUND OF THE INVENTION

1. Field of the Invention

The present invention relates to a tristimulus calorimeter which measures the tristimulus color content of light incident thereon. More particularly, the invention relates to a template-type colorimeter in which both diffraction means for diffracting incident light and templates for spatially filtering the diffracted light are mounted on a common light-transparent substrate.

2. Description of the Related Art

Tristimulus calorimeters are instruments whose outputs are directly proportional to the tristimulus values of one or another of the CIE standard colorimetric observers, such as the CIE 1931 XYZ tristimulus values or RGB tristimulus values. Such instruments are useful in measuring the color content of light and they are used in connection with color reproduction, color matching, color research, etc.

Wyszecki, et al., at pages 243–248 in "Color Science: Concepts and Methods", John Wiley & Sons (1982), describe two different types of tristimulus colorimeters: filter-type calorimeters and template-type calorimeters. In filter-type calorimeters, three tristimulus filters are provided to filter radiant light, the spectral transmittance of the filters matching the desired CIE color-matching function. Three filtered light components from respective ones of the filters are measured by photo cells to provide the desired CIE tristimulus values. Filter-type colorimeters are inexpensive but are usually less accurate because of the difficulty in obtaining filters having the proper spectral transmittance functions.

In template-type calorimeters, radiant light is diffracted by diffraction means such as a diffraction grating or a prism into its spectral components. Templates having spatial filters which match the desired CIE color-matching functions are arranged to block some of the spectral components and to transmit only selected spectral components in accordance with the CIE color-matching function. Detectors are provided behind each template to measure the transmitted spectral components, thereby to output the desired CIE tristimulus values. Template-type calorimeters are accurate but they are more expensive.

SUMMARY OF THE INVENTION

It is an object of the invention to address the foregoing situation and to provide a template-type colorimeter that is relatively inexpensive.

In one aspect, the invention is a template-type calorimeter comprising a light-transparent substrate having a diffraction grating on a surface thereof, the diffraction grating being operative to diffract light incident thereon from a spaced-apart aperture into its constituent spectral components. A template is provided on a surface of the substrate and arranged to receive the diffracted spectral components. The template has formed thereon at least three spatial filters, each for selectively transmitting the diffracted spectral components in accordance with respective ones of the desired color-matching functions such as the CIE $\bar{x}(\lambda)$, $\bar{y}(\lambda)$, $\bar{z}(\lambda)$ or $\bar{r}(\lambda)$, $\bar{g}(\lambda)$, $\bar{b}(\lambda)$ color-matching functions. Because both the diffraction grating and the spatial filter template are mounted on a common substrate, relative positioning between the two can be accomplished with great accuracy. The diffraction grating and the template may be mounted on opposite sides of the substrate, or they may be mounted in a laterally spaced-apart relationship on the same side of the substrate, in which case the opposite side of the substrate is coated with a reflective material. Detectors are arranged adjacent each spatial filter to detect the spectral components transmitted by the respective filters, and the entire assembly is mounted in a light-tight housing which houses the aperture and the assembly in the desired spaced-apart relationship.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 2 is a perspective view of a common substrate having a diffraction grating and a spatial filter template mounted thereon, FIG. 2A shows an enlarged inset from FIG. 2, and FIG. 3 is a cross-sectional view of the FIG. 2 arrangement.

FIG. 6 is a graph for explaining the changing response of photodetectors as a function of different light wavelengths.

FIGS. 7 and 8 are views for alternative constructions of spatial filter templates.

DETAILED DESCRIPTION OF THE PREFERRED EMBODIMENT

Figure 1:
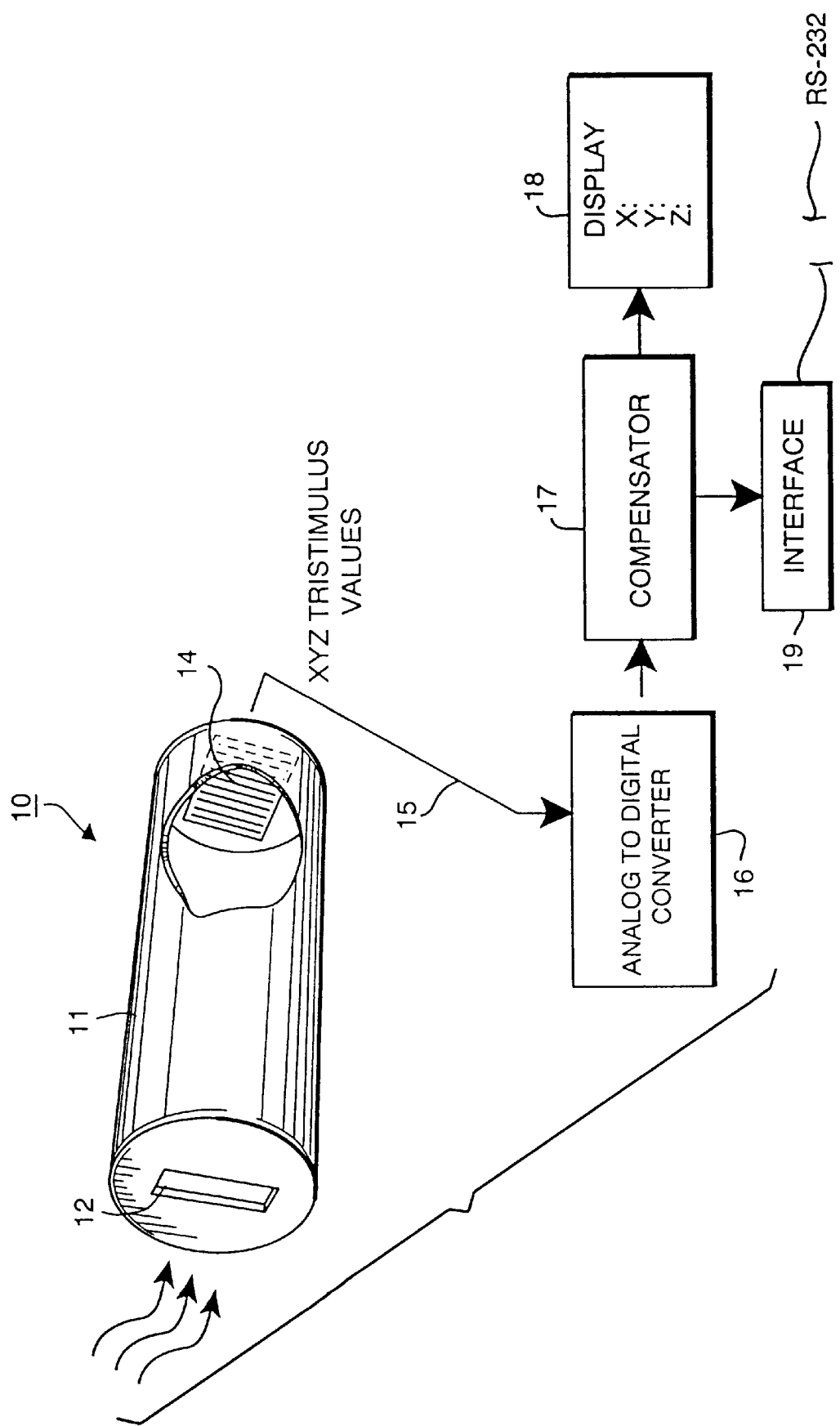
FIG. 1 is a combined perspective view and functional view of a tristimulus colorimeter according to the invention.

FIG. 1 is a combined perspective and functional view of a tristimulus calorimeter according to the invention. As shown in FIG. 1, calorimeter 10 includes a light-tight housing 11 which supports an aperture 12 or other light restricting means in spaced-apart relationship from an assembly 14 in which both a diffraction grating and a spatial filter template are mounted on a common substrate. Preferably, three such spatial filters are provided, each transmitting spectral components corresponding to the desired CIE color-matching function such as the CIE 1931 $\bar{x}(\lambda)$, $\bar{y}(\lambda)$, and $\bar{z}(\lambda)$ color-matching function. The outputs 15 of the spatial filters are provided to analog-to-digital converter 16 which digitizes those signals and provides them to compensator 17. Compensator 17 compensates for errors in outputs 15 such as non-linearities and photodetector errors. Compensator 17 need not be provided where the accuracy of outputs 15 is adequate, but preferably is provided in situations where higher accuracy is needed. The compensated outputs are provided to display 18 for display to a local operator, and may also be provided to digital computer interface 19 so that the measured tristimulus values may be provided to unshown computing equipment such as a local area network or personal computer.

In operation, colorimeter 10 is positioned so that radiant light is incident on aperture 12 which restricts the incident light and projects it onto assembly 14. For example, calorimeter 10 may be placed so that aperture 12 is adjacent a region on a color monitor so as to measure the tristimulus values of that region on the color monitor. Likewise, the colorimeter may be positioned so that it receives light reflected from a sample material so as to measure the color tristimulus values of the sample material.

FIG. 2 is a perspective view showing assembly 14 in more detail.

As shown in FIG. 2, assembly 14 includes a light-transparent substrate 20 such as hard glass, for example, Corning 7059, or plastic. Mounted on substrate 20 are both a diffraction grating 21 and a spatial filter template 22. In this embodiment, the diffraction grating 21 and spatial filter template 22 are mounted on opposite surfaces of the substrate. The diffraction grating 21 is effective to diffract light incident thereon from spaced-apart aperture 12 into its constituent spectral components, as shown schematically at 24 in which "VGR" refers to the violet, green and red regions of the spectrum, respectively. The thickness T of substrate 20 is selected so as to spread the spectrum over a suitably large region; with the above-referenced Corning 7059 hard glass, a thickness of T=2 mm is found to yield satisfactory results when the spacing "a" between lines of the diffraction grating is 10 micrometers.

Both diffraction grating 21 and spatial filter template 22 may be formed by deposition, by etching or by photolithographic techniques directly on substrate 20, or they may be formed independently and laminated directly to substrate 20. In particular, if photolithographic techniques are used, then an emulsion such as the one used in Kodak® Technical Pan Film 6415 developed in Kodak Technidol LC developer will provide a resolution of 3.12 micrometers, which is suitable for formation of both the diffraction grating and the spatial filter template.

Although diffraction grating 21 is preferred for use as diffraction means in the FIG. 2 assembly, other diffraction means such as a prism may also be used so long as the diffraction means diffracts light incident thereon from spaced-apart aperture 12 into its constituent spectral components.

FIG. 3 is a cross-sectional view of the FIG. 2 assembly taken along line 3—3. As shown in FIG. 3, spatial filter template 22 has three filter areas 25, 26 and 27, spaced longitudinally along the template so that each receives the full spectrum 24. Adjacent and behind each spatial filter are respective photosensitive detectors 39, 40 and 41. As shown in FIG. 3, the photosensitive detectors are wide-area detectors so as to detect light from a wide area on the template. Of course, should narrow-area detectors be used instead, then collecting means or other suitable means for collecting and integrating light and channeling light to the detectors may be interposed between the template and the detector.

Figure 4:
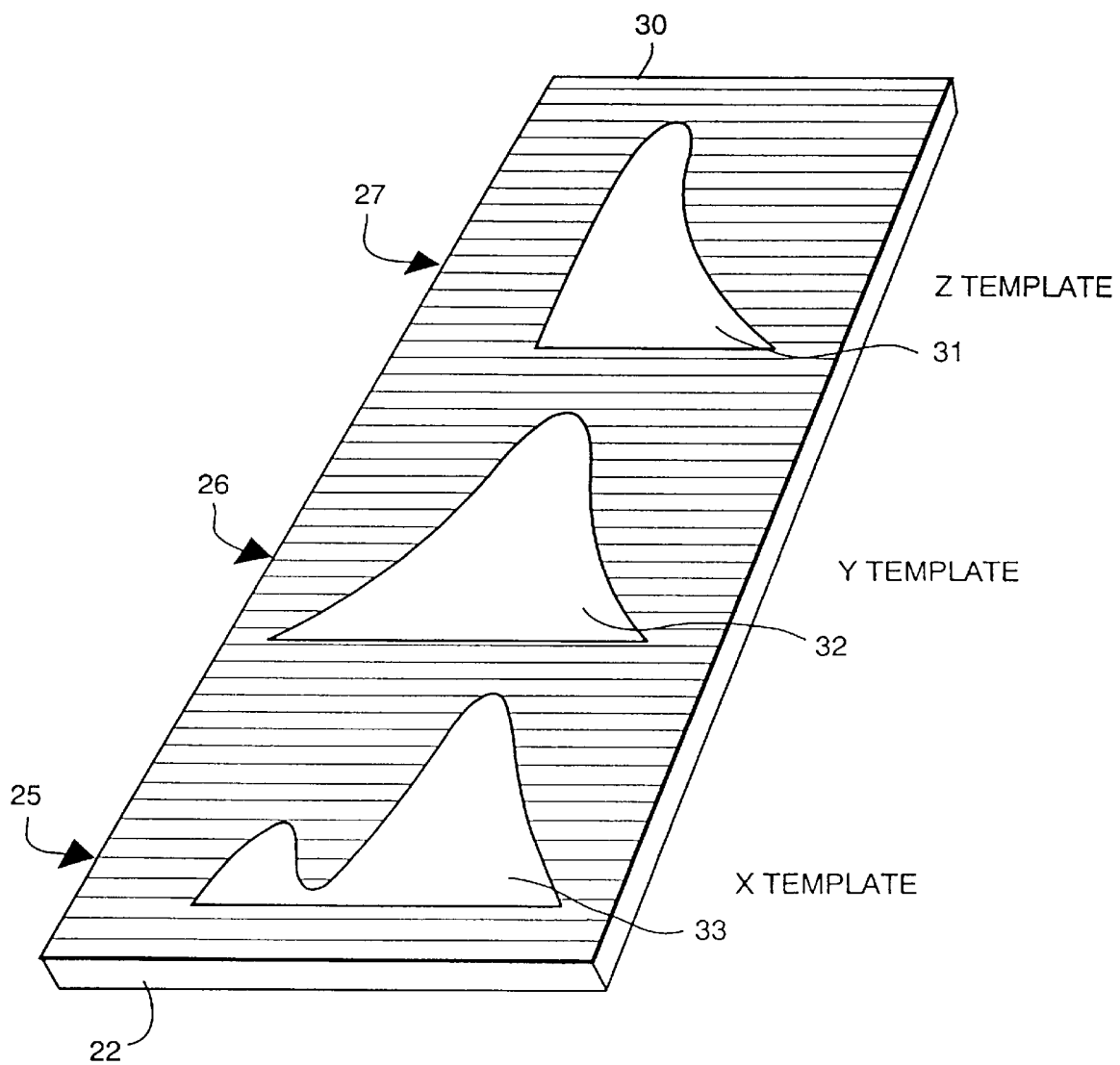
FIG. 4 is a view showing the FIG. 3 spatial filter template.

FIG. 4 is a cutaway view showing representative spatial filters used to provide CIE $\bar{x}(\lambda)$, $\bar{y}(\lambda)$, $\bar{z}(\lambda)$ color-matching functions. As described above in connection with FIG. 3, spatial filter template 22 includes three areas 25, 26 and 27, each exposed to the full spectrum 24 and each for providing a different one of the tristimulus color-matching functions. The template includes an opaque area 30 which blocks light, and three transparent areas 31, 32 and 33, each of which selectively transmits the diffracted spectral components 24 in accordance with respective ones of the color-matching functions.

In FIG. 4, filters for CIE $\bar{x}(\lambda)$, $\bar{y}(\lambda)$, $\bar{z}(\lambda)$ color-matching functions are shown; other filters such as RGB filters may also be provided. In addition, the filters can also be in the shape of the spectral sensitivity functions for cones in the retina of an eye. In this latter case, it is preferable also to provide a fourth template relating to the spectral sensitivity function for the rods in the retina. With this arrangement, display 18 displays cone and rod responses instead of tristimulus values.

In operation, light incident on diffraction grating 21 from spaced-apart aperture 12 is diffracted into its constituent spectral components 24. The spectral components are transmitted through substrate 20 where they are filtered by spatial filter template 22. Each spatial filter 31, 32 and 33 on the template transmits predetermined spectral components in accordance with respective ones of the color-matching functions. The transmitted spectral components are detected by respective ones of detectors 39, 40 and 41 and the detected outputs are provided via outputs 15 to analog-to-digital converter 16, as described above.

Figure 5:
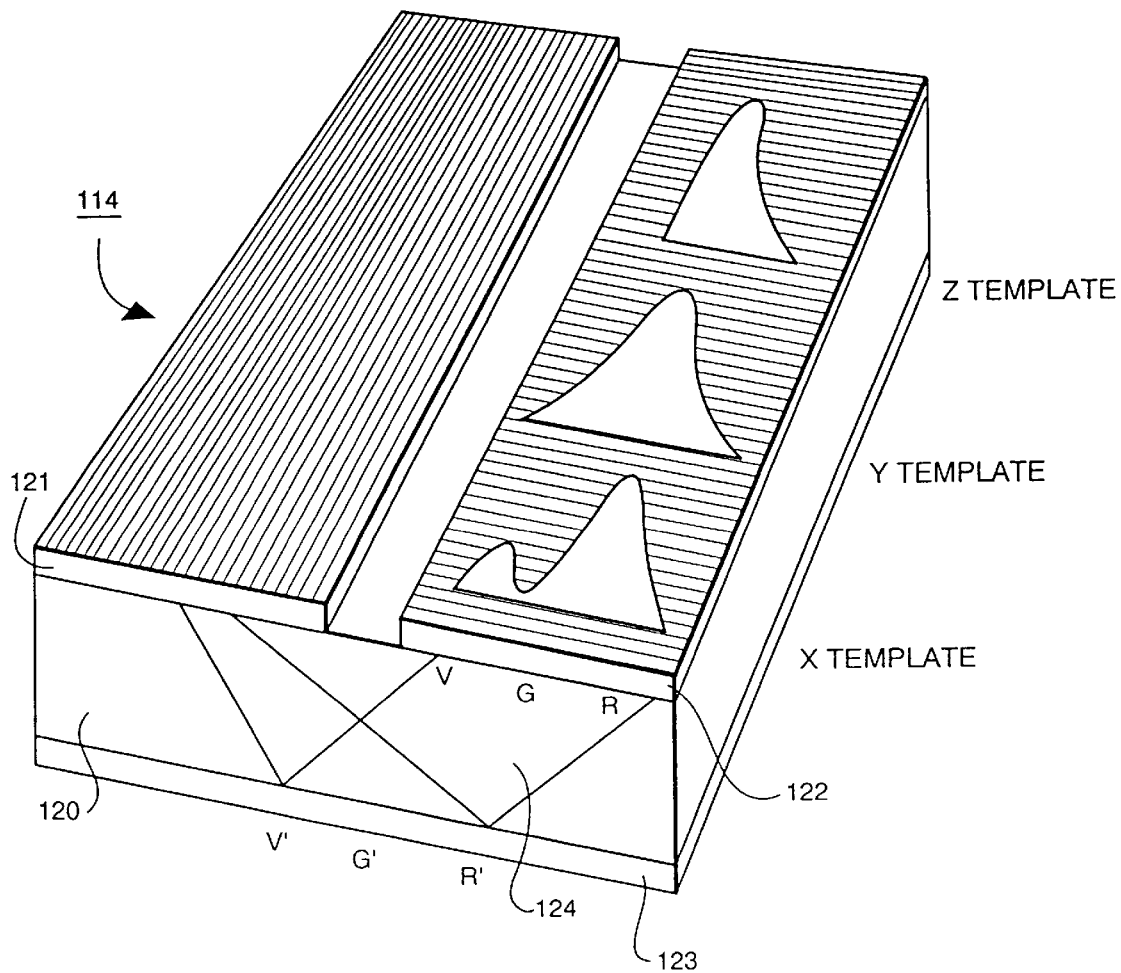
FIG. 5 is a perspective view of an alternate embodiment of the invention in which a diffraction grating and a spatial filter template are mounted on a common substrate.

FIG. 5 is a perspective view of an alternative embodiment of assembly 14. As shown in FIG. 5, assembly 114 includes diffraction grating 121 or other diffraction means mounted on the same substrate 120 as spatial filter template 122. Both diffraction grating 121 and spatial filter template 122 are mounted on the same side of the substrate in a laterally spaced-apart relationship. On the opposite side of the substrate, reflector 123 reflects diffracted spectral components 124 from grating 121 to the spatial filter template 122. The FIG. 5 embodiment is advantageous since it allows the spectral components to traverse the substrate 120 twice, thereby effectively increasing the spectral width of spectral components 124.

The spatial filters used in the practice of the invention may correspond exactly to the desired tristimulus color-matching functions, but they may also be any linear combination thereof. In particular, certain situations require tristimulus difference values, and the spatial filter templates may be modified so as to provide the desired difference values rather than the precise tristimulus values.

Preferably, the spatial filters also compensate for the detection sensitivity characteristics of the photodetectors 39, 40 and 41. More particularly, as shown in FIG. 6, typical photodetector response is not constant over all wavelengths of visible light, but rather varies in accordance with the wavelength of light incident thereon. As shown in FIG. 6, relative response for shorter wavelength light (450 nanometers, corresponding to the violet region of the spectrum) is lower than the relative response for longer wavelengths of light (750 nanometers, corresponding to the red end of the spectrum). In accordance with the relative spectral response of the photodetectors, the spatial filter characteristics may be altered. Thus, if photodetectors having the characteristics shown in FIG. 6 are used, then the spatial filters should be modified so as to increase the amount of light transmitted from the violet end of the spectrum with respect to the red end of the spectrum.

FIGS. 7 and 8 show alternative arrangements for spatial filters. As shown in these figures, it is not strictly necessary to provide spatial filters which "look" exactly like the desired spectral response. Rather, as shown in FIG. 7, which is a spatial filter suitable for the $\bar{x}(\lambda)$ color-matching function, mirror images 33a and 33b of the desired spectral transmittance are provided on opposite sides of opaque area 30. Likewise, in FIG. 8, rather than using fully opaque and fully transmissive areas, partially transmissive areas are used. Thus, regions 33c are dense regions allowing relatively little light to be transmitted therethrough, while regions 33d and 33e are less dense regions allowing respectively greater amounts of light to be transmitted therethrough. The embodiments of FIGS. 7 and 8 are advantageous relative to the templates in the FIGS. 4 and 5 embodiments in that they transmit selected spectral components with greater diffusion and with greater smoothness, thereby allowing detection with greater ease and possibly without the need for collecting means.

What is claimed is:

1. A spectral filter assembly comprising:

a substrate having diffraction means disposed on a surface of said substrate and a template disposed on a surface of said substrate, the diffraction means for diffracting light incident thereon from a spaced-apart aperture into a plurality of spectral components, the substrate having a thickness sufficient to spread the plurality of spectral components over the template, the template being arranged to receive the plurality of spectral components, and the template having at least one spatial filter thereon which receives the plurality of spectral components and which selectively filters the plurality of spectral components so as to transmit predetermined spectral components; and a detector for detecting the predetermined spectral components transmitted by the template.

2. An assembly according to claim 1, wherein said diffraction means are comprised by a diffraction grating.

3. An assembly according to claim 1, wherein said diffraction means are comprised by a prism.

4. An assembly according to claim 1, further comprising collection means for collecting the predetermined spectral components transmitted by the template from the template and for providing the spectral components collected by said collection means to said detector.

5. An assembly according to claim 1, further comprising means for digitizing an output of said detector.

6. An assembly according to claim 1, wherein said diffraction means is arranged on one side of said substrate and the template is arranged on the opposite side thereof.

7. An assembly according to claim 1, wherein said diffraction means and said template are arranged on the same side of the substrate, and further comprising a reflector on the opposite side thereof.

8. A spectral filter assembly according to claim 1, wherein a portion of the template is partially transmissive.

9. A spectral filter assembly according to claim 1, wherein the at least one spatial filter on the template is shaped so as to compensate for detection sensitivity characteristics of the detector.

10. A calorimeter comprising:

a light-transparent substrate having a diffraction grating disposed on a surface of said light-transparent substrate and a template disposed on a surface of said light-transparent substrate, the diffraction grating being operative to diffract light incident thereon from a spaced-apart aperture into a plurality of spectral components, the light-transparent substrate having a thickness sufficient to spread the plurality of spectral components over the template, the template being arranged to receive the plurality of spectral components, and the template having at least three spatial filters, each for receiving the plurality of spectral components and for selectively transmitting predetermined spectral components in accordance with respective color matching functions; and plural detectors, one for each spatial filter, for detecting the predetermined spectral components transmitted from the at least three spatial filters.

11. A colorimeter according to claim 10, wherein said plural detectors are fixedly attached adjacent respective ones of the spatial filters.

12. A colorimeter according to claim 10, wherein the spatial filters comprise $\bar{x}(\lambda), \bar{y}(\lambda), \bar{z}(\lambda)$ color-matching functions.

13. A calorimeter according to claim 10, wherein the spatial filters comprise $\bar{r}(\lambda), \bar{g}(\lambda), \bar{b}(\lambda)$ color-matching functions.

14. A colorimeter according to claim 10, wherein the spatial filters comprise retinal color matching functions.

15. A colorimeter according to claim 10, wherein the spatial filters comprise a linear combination of color-matching functions.

16. A calorimeter according to claim 15, wherein the spatial filters comprise a difference function of color-matching functions.

17. A calorimeter according to claim 10, further comprising collection means interposed between the spatial filters and their respective detectors for collecting light transmitted from the spatial filters and for providing the collected light to the detectors.

18. A calorimeter according to claim 10, further comprising digitizing means for digitizing outputs of said plural detectors.

19. A colorimeter according to claim 18, further comprising display means for displaying the digitized output.

20. A colorimeter according to claim 18, further comprising a computer interface for providing digital tristimulus color-matching values to computing means.

21. A colorimeter according to claim 10, further comprising a light-tight housing which houses the aperture and the substrate in said spaced-apart relationship.

22. A colorimeter according to claim 10, wherein said diffraction grating is on one side of said substrate and said template is on the opposite side of the substrate.

23. A colorimeter according to claim 10, wherein the diffraction grating and the template are arranged on the same side of the substrate, and further comprising a reflector on the opposite side of the substrate.

24. A calorimeter according to claim 10, wherein a portion of the template is partially transmissive.

25. A calorimeter according to claim 10, wherein the at least three spatial filters on the template are shaped so as to compensate for detection sensitivity characteristics of the plural detectors.

26. A calorimeter comprising:

a light-transparent substrate having diffraction means disposed on a surface of said light-transparent substrate and a template disposed on a surface of said light-transparent substrate, the diffraction means for diffracting light incident thereon into a plurality of spectral components, said light-transparent substrate having a thickness sufficient to spread the plurality of spectral components over the template, the template being arranged to receive the plurality of spectral components, and the template having at least three spatial filters, each for receiving the plurality of spectral components and for selectively transmitting predetermined spectral components in accordance with respective color-matching functions;

plural detectors, one for each spatial filter, fixedly attached adjacent to the at least three spatial filters, for detecting light transmitted by a respective spatial filter; and a light-tight housing which houses said light-transparent substrate in a spaced-apart relationship from a light aperture which is arranged to restrict light reaching the diffraction means.

27. A calorimeter according to claim 26, wherein said diffraction means are comprised by a diffraction grating.

28. A calorimeter according to claim 26, wherein said diffraction means are comprised by a prism.

29. A calorimeter according to claim 26, wherein said diffraction means is arranged on one side of said substrate and the template is arranged on the opposite side thereof.

30. A colorimeter according to claim 26, wherein said diffraction means and said template are arranged on the same side of the substrate, and further comprising a reflector on the opposite side thereof.

31. A colorimeter according to claim 26, wherein the spatial filters comprise $\overline{x}(\lambda), \overline{y}(\lambda), \overline{z}(\lambda)$ color-matching functions.

32. A calorimeter according to claim 26, wherein the spatial filters comprise $\overline{r}(\lambda), \overline{g}(\lambda), \overline{b}(\lambda)$ color-matching functions.

33. A calorimeter according to claim 26, wherein the spatial filters comprise retinal color matching functions.

34. A calorimeter according to claim 26, wherein the spatial filters comprise a linear combination of color-matching functions.

35. A colorimeter according to claim 34, wherein the spatial filters comprise a difference function of color-matching functions.

36. A calorimeter according to claim 26, further comprising digitizing means for digitizing outputs of said plural detectors.

37. A colorimeter according to claim 36, further comprising display means for displaying the digitized output.

38. A colorimeter according to claim 36, further comprising a computer interface for providing digital tristimulus color-matching values to computing means.

39. A calorimeter according to claim 26, wherein a portion of the template is partially transmissive.

40. A colorimeter according to claim 26, wherein the at least three spatial filters on the template are shaped so as to compensate for detection sensitivity characteristics of the plural detectors.

41. A spectral filter assembly comprising:
a diffraction means formed by a photolithographic process and attached to a surface of a light-transparent substrate, said diffraction means for diffracting light incident thereon from a spaced-apart aperture into constituent spectral components of the light;
a spatial filter template disposed on a surface of the light-transparent substrate for receiving the constituent spectral components via the light-transparent substrate and for selectively filtering the constituent spectral components so as to transmit predetermined spectral components, said spatial filter template being formed by the photolithographic process, and the light-transparent substrate having a thickness sufficient to spread the constituent spectral components over said spatial filter template; and
a detector for detecting the predetermined spectral components transmitted by said spatial filter template.

42. A spectral filter assembly according to claim 41, wherein the photolithographic process includes forming said diffraction means and said spatial filter template directly on the light-transparent substrate.

43. A spectral filter assembly according to claim 42, wherein the photolithographic process includes forming said diffraction means and said spatial filter template using an emulsion.

44. A spectral filter assembly according to claim 43, wherein the emulsion provides a resolution of 3.12 micrometers.

45. A spectral filter assembly according to claim 41, wherein the photolithographic process includes forming said diffraction means and said spatial filter template separately from the light-transparent substrate and laminating said diffraction means and said spatial filter template directly onto the light-transparent substrate.

46. A spectral filter assembly according to claim 45, wherein the photolithographic process includes forming said diffraction means and said spatial filter template using an emulsion.

47. A spectral filter assembly according to claim 46, wherein the emulsion provides a resolution of 3.12 micrometers.

48. A spectral filter assembly according to claim 41, wherein the thickness of the light-transparent substrate is 2 millimeters.

49. A spectral filter assembly according to claim 41, wherein said diffraction means includes a plurality of lines for diffracting the incident light.

50. A spectral filter assembly according to claim 49, wherein a spacing between adjacent lines in the plurality of lines is 10 micrometers.

51. A spectral filter assembly according to claim 50, wherein the thickness of the light-transparent substrate is 2 millimeters.

52. A spectral filter assembly according to claim 41, wherein a portion of the spatial filter template is partially transmissive.

53. A spectral filter assembly according to claim 41, wherein the spatial filter template is shaped so as to compensate for detection sensitivity characteristics of the detector.

* * * * *

UNITED STATES PATENT AND TRADEMARK OFFICE
CERTIFICATE OF CORRECTION

PATENT NO. : 5,900,932

DATED : May 4, 1999

INVENTOR(S) : Giordano Bruno Beretta

Page 1 of 3

It is certified that error appears in the above-identified patent and that said Letters Patent is hereby corrected as shown below:

ON THE COVER PAGE

In the first line of the Abstract, change "calorimeter" to --colorimeter--.

COLUMN 1

Line 11, change "calorimeter" to --colorimeter--;
line 20, change "calorimeters" to --colorimeters--;
line 30, change both occurrences of "calorimeters" to --colorimeters--;
line 31, change "calorimeters" to --colorimeters--;
line 40, change "calorimeters" to --colorimeters--;
line 49, change "calorimeters" to --colorimeters--; and
line 57, change "calorimeter" to --colorimeter--.

COLUMN 2

Line 42, change "calorimeter" to --colorimeter--;
line 43, change "calorimeter" to --colorimeter--; and
line 67, change "calo-" to -- colo- --;

UNITED STATES PATENT AND TRADEMARK OFFICE
CERTIFICATE OF CORRECTION

PATENT NO. : 5,900,932

DATED : May 4, 1999

INVENTOR(S) : Giordano Bruno Beretta

It is certified that error appears in the above-identified patent and that said Letters Patent is hereby corrected as shown below:

COLUMN 5

Line 48, change "calorimeter" to --colorimeter--.

COLUMN 6

```
Line  6, change "calorimeter" to --colorimeter--;
line 11, change "calorimeter" to --colorimeter--;
line 14, change "calorimeter" to --colorimeter--;
line 17, change "calorimeter" to --colorimeter--;
line 22, change "calorimeter" to --colorimeter--;
line 41, change "calorimeter" to --colorimeter--;
line 43, change "calorimeter" to --colorimeter--; and
line 47, change "calorimeter" to --colorimeter--.
```

UNITED STATES PATENT AND TRADEMARK OFFICE
CERTIFICATE OF CORRECTION

PATENT NO. : 5,900,932

DATED : May 4, 1999

INVENTOR(S) : Giordano Bruno Beretta

It is certified that error appears in the above-identified patent and that said Letters Patent is hereby corrected as shown below:

<u>COLUMN 7</u>

```
Line  3, change "calorimeter" to --colorimeter--;
line  5, change "calorimeter" to --colorimeter--;
line  7, change "calorimeter" to --colorimeter--;
line 17, change "calorimeter" to --colorimeter--;
line 20, change "calorimeter" to --colorimeter--;
line 22, change "calorimeter" to --colorimeter--;
line 28, change "calorimeter" to --colorimeter--; and
line 36, change "calorimeter" to --colorimeter--.
```

<u>IN THE DRAWINGS</u>

Sheet 2, Figure 3, change reference numeral "29" to --39--, change reference numeral "30" to --40--; and change reference numeral "31" to --41--.

Signed and Sealed this

First Day of February, 2000

Attest:

Q. TODD DICKINSON

*Attesting Officer*       *Acting Commissioner of Patents and Trademarks*